United States Patent
Jiang et al.

(10) Patent No.: US 11,680,807 B2
(45) Date of Patent: Jun. 20, 2023

(54) PROBABILISTIC DECISION ENGINE

(71) Applicant: University of Dayton, Dayton, OH (US)

(72) Inventors: Zhenhua Jiang, Dayton, OH (US); Seyed Ataollah Raziei, Dayton, OH (US)

(*) Notice: Subject to any disclaimer, the term of this patent is extended or adjusted under 35 U.S.C. 154(b) by 364 days.

(21) Appl. No.: 16/930,808

(22) Filed: Jul. 16, 2020

(65) Prior Publication Data
US 2021/0018322 A1    Jan. 21, 2021

Related U.S. Application Data

(60) Provisional application No. 62/874,888, filed on Jul. 16, 2019.

(51) Int. Cl.
| | |
|---|---|
| *G01C 21/34* | (2006.01) |
| *B60W 60/00* | (2020.01) |
| *G06F 16/901* | (2019.01) |
| *G06F 17/18* | (2006.01) |
| *G05D 1/00* | (2006.01) |
| *G06N 3/047* | (2023.01) |

(52) U.S. Cl.
CPC ..... *G01C 21/3446* (2013.01); *B60W 60/0021* (2020.02); *G05D 1/0088* (2013.01); *G06F 16/9024* (2019.01); *G06F 17/18* (2013.01); *G06N 3/047* (2023.01); *G05D 2201/0213* (2013.01)

(58) Field of Classification Search
CPC .......... B60W 60/0021; G01C 21/3446; G01C 21/34
See application file for complete search history.

(56) References Cited

U.S. PATENT DOCUMENTS 10,535,256 B1 *   1/2020   Lim ................. G08G 1/096811

OTHER PUBLICATIONS

Jiang, Zhenhua et al.; "A Probabilistic Decision Engine for Navigation of Autonomous Vehicles under Uncertainty" 2019 IEEE National Aerospace and Electronics Conference (NAECON); 2019.

* cited by examiner

*Primary Examiner* — Peter D Nolan
*Assistant Examiner* — Jacob Besteman-Street
(74) *Attorney, Agent, or Firm* — Thomas E. Lees, LLC

(57) ABSTRACT

The present disclosure provides a probabilistic decision engine for autonomous vehicles. Briefly described, one embodiment comprises taking a network connection matrix (based on maps and graph theory) and a cost matrix (with entries of the cost's mean values and probability distributions) as input and generates the probability distribution of optimal routes as output. The disclosed probabilistic decision engine comprises a stochastic network standardization module, a stochastic network decomposition module and a probabilistic optimization kernel. A deterministic network reduction method is first used to derive a standard reduced network, augmented by the stochastic network reduction. The standard network is then decomposed into a series of stochastic subnetworks by using the convolution, probability density function (PDF) shifting, and PDF reshaping techniques. A pure-analytical probabilistic solver is finally used to solve the stochastic optimization problem.

7 Claims, 22 Drawing Sheets

| PATH NUMBER | NODES IN ORIGINAL GRAPH | NODES IN STANDARD GRAPH |
|---|---|---|
| 1 | [7, 3, 10, 9] | [7, 9] |
| 2 | [7, 4, 5, 11, 9] | [7, 4, 5, 9] |
| 3 | [7, 2, 1, 5, 11, 9] | [7, 2, 1, 9] |
| 4 | [7, 8, 11, 9] | [7, 8, 11, 9] |
| 5 | [7, 3, 10, 6, 9] | [7, 10, 6, 9] |
| 6 | [7, 4, 5, 1, 8, 11, 9] | [7, 4, 5, 8, 11, 9] |
| 7 | [7, 2, 1, 8, 11, 9] | [7, 2, 1, 8, 11, 9] |

FIG. 16

| PATH INDEX | PATH | | | | OCCURRENCE CHANCE | | |
|---|---|---|---|---|---|---|---|
| | | | | | ANALYTICAL | MONTE-CARLO 1 | MONTE-CARLO 2 |
| 1 | 7 | 9 | 0 | 0 | 10.42% | 10.32% | 10.52% |
| 2 | 7 | 4 | 5 | 9 | 17.25% | 18.21% | 17.14% |
| 3 | 7 | C | 1 | 9 | 36.36% | 35.43% | 36.44% |
| 4 | 7 | 8 | 11 | 9 | 14.61% | 14.75% | 14.62% |
| 5 | 7 | 10 | 6 | 9 | 21.36% | 21.30% | 21.28% |

FIG. 17

| NUMBER OF SAMPLES | PATH INDEX | | | | | SUM |
|---|---|---|---|---|---|---|
| | 1 | 2 | 3 | 4 | 5 | |
| 300 | 0.010 | 0.006 | 0.002 | 0.001 | 0.004 | 0.023 |
| 250 | 0.043 | 0.005 | 0.006 | 0.025 | 0.033 | 0.111 |
| 200 | 0.055 | 0.027 | 0.014 | 0.006 | 0.016 | 0.118 |
| 150 | 0.019 | 0.062 | 0.011 | 0.032 | 0.001 | 0.125 |
| 100 | 0.020 | 0.034 | 0.040 | 0.034 | 0.054 | 0.182 |

FIG. 18

| CONFIDENCE INTERVAL | PATH INDEX | | | | | SUM |
| --- | --- | --- | --- | --- | --- | --- |
| | 1 | 2 | 3 | 4 | 5 | |
| 99% | 0.010 | 0.006 | 0.002 | 0.001 | 0.004 | 0.023 |
| 95% | 0.052 | 0.090 | 0.047 | 0.049 | 0.069 | 0.306 |
| 90% | 0.131 | 0.047 | 0.109 | 0.081 | 0.069 | 0.306 |

FIG. 19

| INTERVAL WIDTH | PATH INDEX | | | | | SUM |
|---|---|---|---|---|---|---|
| | 1 | 2 | 3 | 4 | 5 | |
| 0.0005 | 0.003 | 0.003 | 0.004 | 0.000 | 0.005 | 0.016 |
| 0.001 | 0.010 | 0.006 | 0.002 | 0.001 | 0.004 | 0.023 |
| 0.002 | 0.024 | 0.014 | 0.001 | 0.003 | 0.001 | 0.042 |
| 0.005 | 0.064 | 0.028 | 0.012 | 0.009 | 0.009 | 0.122 |
| 0.01 | 0.129 | 0.066 | 0.028 | 0.020 | 0.024 | 0.267 |

FIG. 20

PROBABILISTIC DECISION ENGINE

CROSS REFERENCE TO RELATED APPLICATIONS

This application claims the benefit of U.S. Provisional Patent Application Ser. No. 62/874,888, filed Jul. 16, 2019, entitled "PROBABILISTIC DECISION ENGINE", the disclosure of which is hereby incorporated by reference.

BACKGROUND

Field of the Disclosure

The present disclosure relates generally to autonomous vehicles and, more particularly, to a probabilistic decision engine for navigation of autonomous vehicles.

Description of Related Art

In the past years, autonomous vehicles, such as self-driving cars, drones and unmanned aerial systems (UASs), have found increasing applications in commercial and other missions. An important feature of these systems is that they possess a variety of autonomy capabilities such as sensing, reasoning, and action skills; however, these systems typically operate in an uncertain or dynamically changing environment. This will require a capability of robust operation for an extensive period of time with minimal or no human operator intervention. A variety of navigation and path planning algorithms have been widely investigated.

Navigation or route planning under uncertain conditions is very challenging but important for these autonomous vehicles. To improve the system performance, it is necessary to capture these uncertain factors and consider them in the planning and operation globally; however, a solid theoretical foundation is lacking that accounts for the uncertainty throughout the entire process. To account for the uncertainty in the autonomous vehicles and their dynamic environment, probabilistic methods to the analysis, modeling and optimization are urgently needed and beneficial. However, the probabilistic optimization in these autonomous planning and operation problems is highly challenging due to the complexity of probabilistic algorithms and the long time needed to find the probabilistic solution.

Traditional methods use Monte Carlo simulation to obtain statistical results in a large number of scenarios and derive the probability distribution based on these simulation results; however, these methods are very time-consuming and make the real-time operation very difficult or intractable.

SUMMARY

The present disclosure provides a probabilistic decision engine for autonomous vehicles. Briefly described, one embodiment comprises taking a network connection matrix (based on maps and graph theory) and a cost matrix (with entries of the cost's mean values and probability distributions) as input and generates the probability distribution of optimal routes as output. The disclosed probabilistic decision engine comprises a stochastic network standardization module, a stochastic network decomposition module and a probabilistic optimization kernel. A deterministic network reduction method is first used to derive a standard reduced network, augmented by the stochastic network reduction. The standard network is then decomposed into a series of stochastic subnetworks by using the convolution, probability density function (PDF) shifting, and PDF reshaping techniques. A pure-analytical probabilistic solver is finally used to solve the stochastic optimization problem.

According to aspects of the present disclosure, an autonomous vehicle comprises a sensor that produces environmental data, a location tracker that produces location data, and a processor. The processor converts the environmental data and the location data to maps and localization data, which are then converted to a navigation model. Further, the processor creates a network connection matrix based on the navigation model and derives a standardized reduced network based on the network connection matrix using a deterministic network reduction and a stochastic network reduction; Moreover, the processor creates a decomposed network by decomposing the standardized reduced network to create stochastic subnetworks, wherein the decomposing is performed using convolution, a probability density function, and probability density function reshaping. Then, the processor determines an optimal solution for a navigation route based on the probability distribution of optimal routes of the decomposed network using a probabilistic solver. Once an optimal route is determined, the processor creates instructions for components of the autonomous vehicle based on the optimal solution and controls the autonomous vehicle based on the instructions.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 16 shows node index tracking on a standardized network.

FIG. 17 shows probability values of possible optimal paths.

FIG. 18 shows relative error between the disclosed analytical method (baseline) and a Monte Carlo simulation with different numbers of samples.

FIG. 19 shows a relative error comparison for different confidence intervals.

FIG. 20 shows a relative error comparison for different interval widths.

DETAILED DESCRIPTION OF THE EMBODIMENTS

This disclosure provides analytical, probabilistic decision engines and processes that can serve as a core for navigation of autonomous vehicles under uncertain and dynamic environments. Sensor data that are collected and processed locally and real-time traffic flow data, as well as a simultaneous localization and mapping (SLAM) algorithm, can be used together to generate location information, routing networks, and cost knowledge. The probabilistic decision engine takes a network connection matrix (based on maps and graph theory) and a cost matrix (whose entries are the cost's mean values and its probability distributions) as its input and generates the probability distributions of optimal routes as its output, at any decision step, e.g., every 100 milliseconds.

This disclosure provides an operational principle of the probabilistic decision engine. Then, implementation methods will be formulated for stochastic navigation, where a solution procedure and challenges in solving the problem are discussed. Representative results will be provided thereafter to demonstrate the effectiveness of the disclosed computational solver and compared with the traditional Monte-Carlo simulation method to validate the analytic results. This disclosure suggests that the time needed to find the solution using the proposed decision engine can be greatly reduced compared with the Monte-Carlo method.

An initial, probabilistic computational framework for real-time planning and operation of autonomous vehicles under uncertainty has been proposed. This method considers three levels of planning: navigation—which decides the best possible path to take in the near future, path or motion planning—which decides the immediate path constrained by or subject to obstacles or high costs, and motion control—which aims to determine control actions for the motion actuators.

When planning for movement of autonomous vehicles, an important requirement is to understand its location and its environment. Graph-based modeling can be used to capture a spatial geometry of the environment using maps and 2-D or 3-D grids. Typically, a variety of sensors (such as cameras, radar, LIDAR (light detection and ranging), etc.,) and a location tracker (e.g., global positioning system (GPS) receivers) can collect large volumes of data, and maps and localization information can then be derived from these data sets, where data fusion technologies are applied to develop the models.

Figure 1:
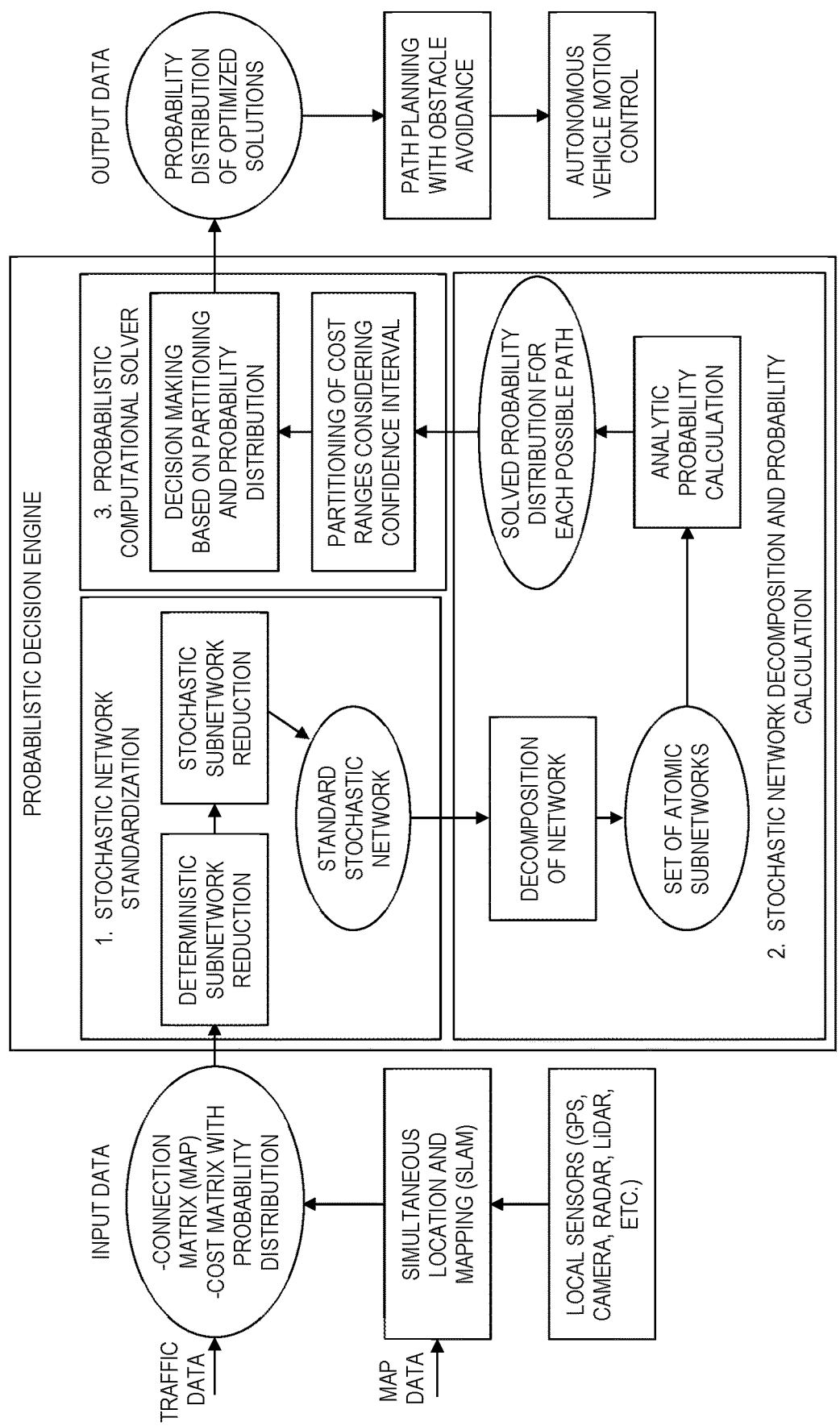
FIG. 1 is an illustration of a probabilistic decision engine comprising a stochastic network standardization module, a stochastic network decomposition module and a probabilistic optimization kernel.
Figure 6:
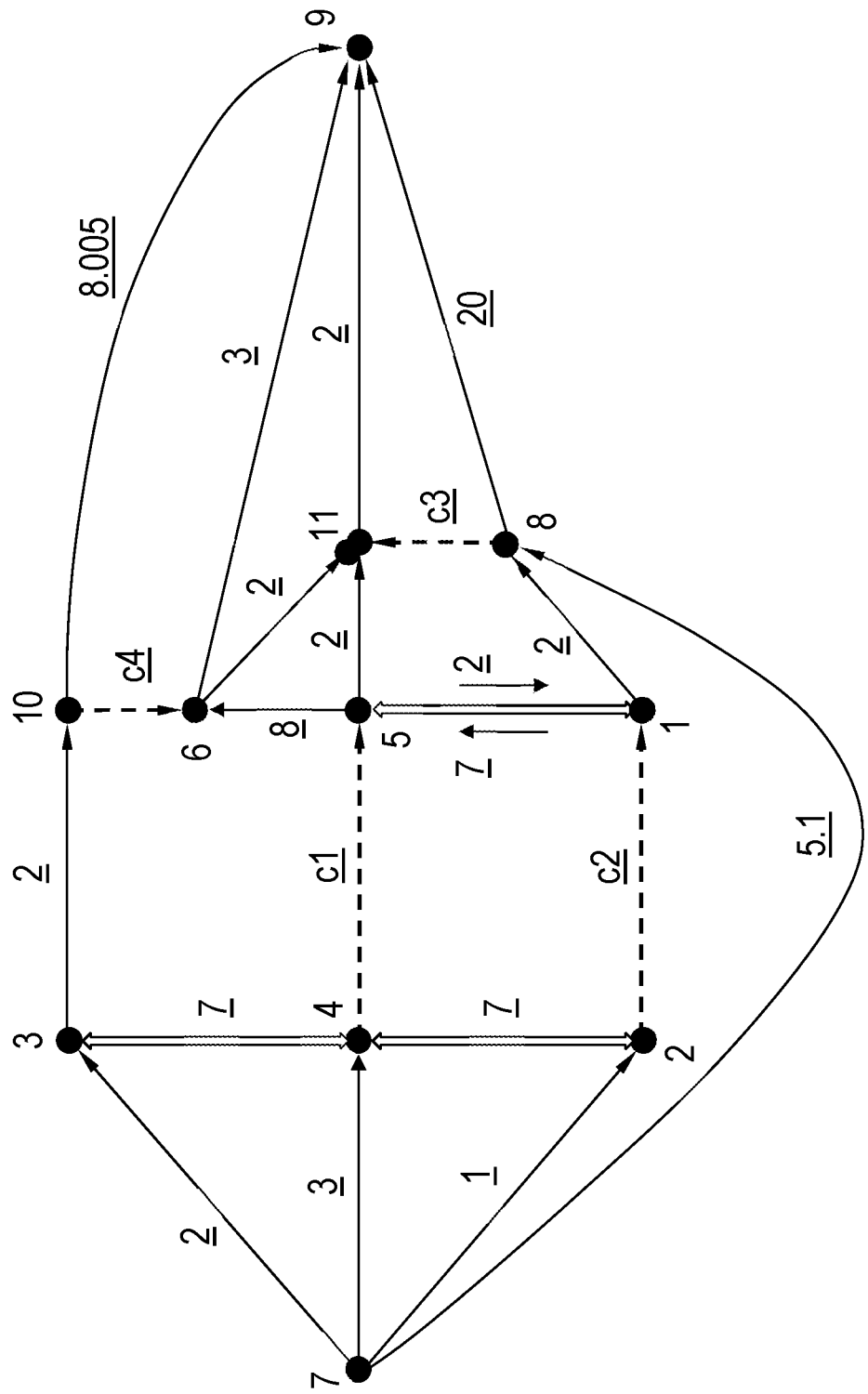
FIG. 6 is an illustration of the network under study where the vehicle moves from Node 7 to Node 9, with solid lines indicating deterministic edges with constant costs and dashed lines representing stochastic costs.
Figure 7A:
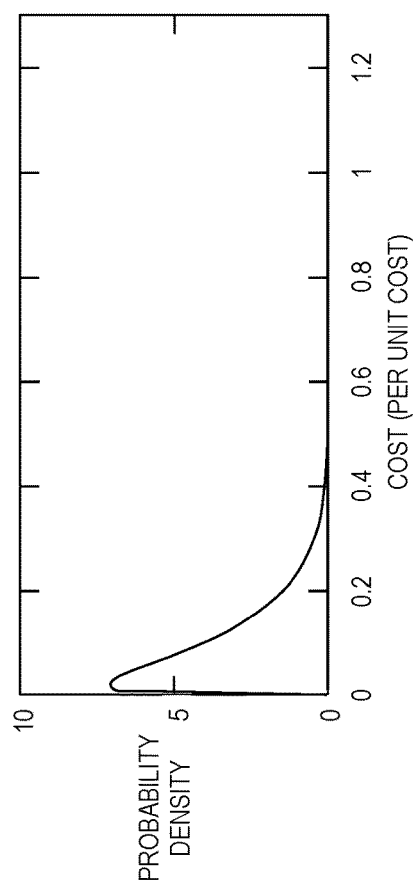
FIGS. 7A-D show probability density curves of the costs for the stochastic edges in the example network.
Figure 7B:
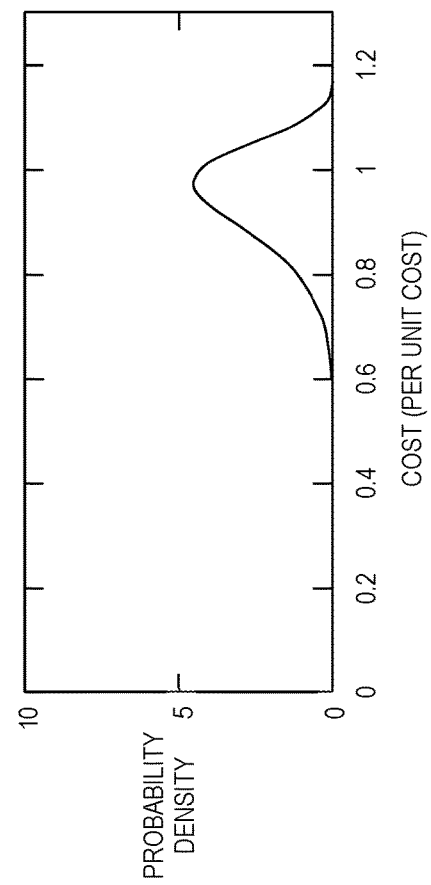
Figure 7C:
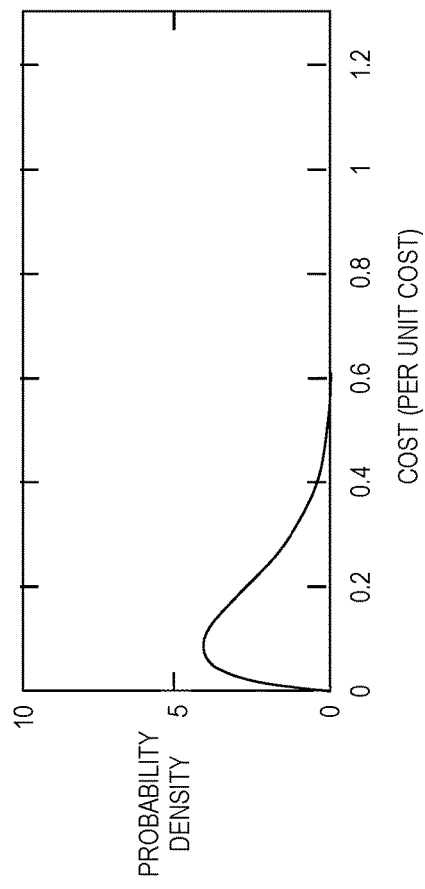
Figure 7D:
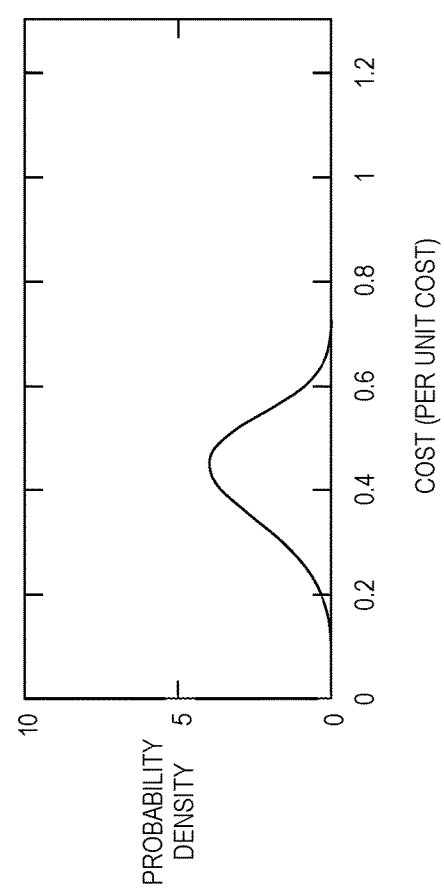

The disclosed probabilistic decision engine is illustrated in FIG. 1, where the blocks represent the performed actions or processes, and the circles indicate the resultant outcomes. The disclosed probabilistic decision engine can serve as a core component for navigation of autonomous vehicles under uncertain and dynamic environments. While data can be collected from various sensors onboard autonomous vehicles and locally processed in real time onboard the vehicles, a simultaneous localization and mapping (SLAM) system can be used to generate the vehicle's location information and routing networks. From real-time traffic data, it is possible to build a model for the traffic flow and congestion conditions and the associated driving costs such as traveling time or fuel costs, which can be represented by a connection/cost network based on maps and graph theory. In navigation of autonomous vehicles, the specific location in the environment is represented by a finite number of nodes and the network shows the nodes and connections among them. A nonnegative numerical value can be assigned to each edge (or branch) which denotes the cost moving from one node to another. An example of such a network is shown in FIG. 6.

Based on available sensor data and processing algorithms, the probabilistic decision engine takes a network connection matrix and a cost matrix (whose entries are the mean values and probability distributions of the costs associated with each edge) as its input and generates probability distributions of optimal routes as its output. Basically, there are three components in the disclosed probabilistic decision engine: a stochastic network standardization module 1, a stochastic network decomposition module 2, and a probabilistic computational solver 3, as shown in FIG. 1. Starting from the original connection and cost networks, a deterministic network reduction method based on path planning algorithms is used to derive a standard reduced network, augmented by a stochastic network reduction process. The standardized network is then decomposed into a series of stochastic subnetworks by using convolution, probability distribution function (PDF) shifting and PDF reshaping techniques. The purely analytical probabilistic solver 3 is finally used to solve the stochastic decision problem. The output is sent to the lower layers for path planning and motion control. Thus, the optimal path is used to control portions of the autonomous vehicle.

Stochastic Network Standardization

Figure 2:
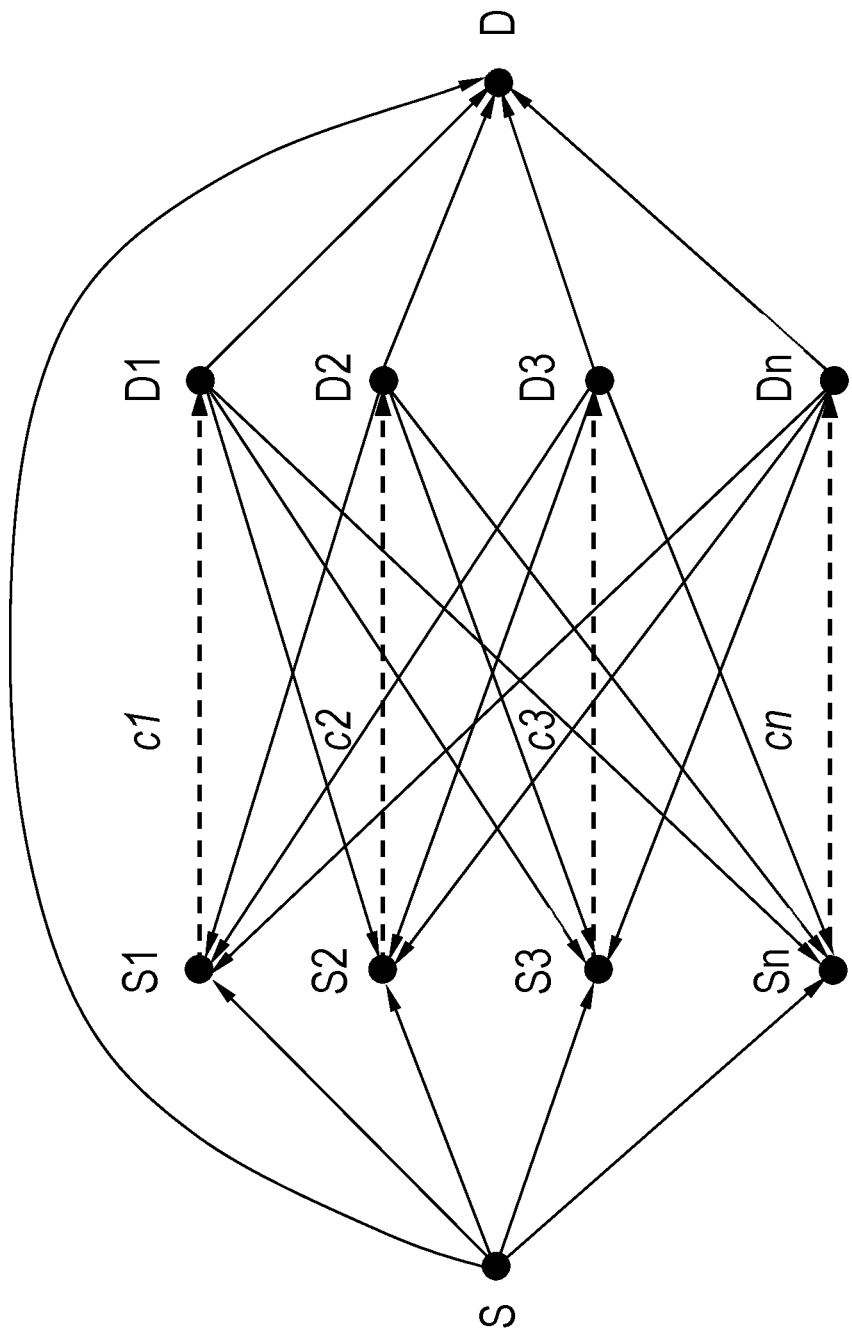
FIG. 2 is an illustration of a standardized network starting point of S and destination of D.

As a stochastic cost network (or graph or matrix) contains some deterministic portions, it is desired to reduce both the deterministic and stochastic portions to smaller subnetworks respectively and combine them together to generate a reduced cost network. In cases of large networks, portions far away from a location under current consideration may usually be assumed to be deterministic, because an impact of uncertainty of those portions on the immediate solution is insignificant and thus negligible. In the proposed framework, a format of the standard, reduced network is defined, as shown in FIG. 2. A number of stochastic routes determines an order of the network, and thus the complexity of the probabilistic optimization algorithm. In FIG. 2, deterministic edges are shown with solid lines, while stochastic edges are shown as dotted lines.

In the process described herein, the deterministic portion of the original network can first be reduced to a simplified equivalent subnetwork by using rules and deterministic optimization. Assuming that all edges have nonnegative cost, Dijkstra's shortest path first algorithm can be used to determine the optimal path in the network with both unidirectional and/or bidirectional edges.

The stochastic portion can be reduced by performing the convolution or other probability calculations. Combining the reduced deterministic subnetwork with the reduced stochastic portion, it is possible to derive the resultant reduced network, as shown in FIG. 2. If there is no possible path between any two nodes, the respective edge is removed from the network. The optimization problem is thus reduced to a much smaller problem with fewer random variables, greatly reducing the solution time. This standardization process renders the remaining calculation modular and scalable, which makes the approach generally applicable to different situations.

Stochastic Network Decomposition and Probability Calculation

Figure 3:
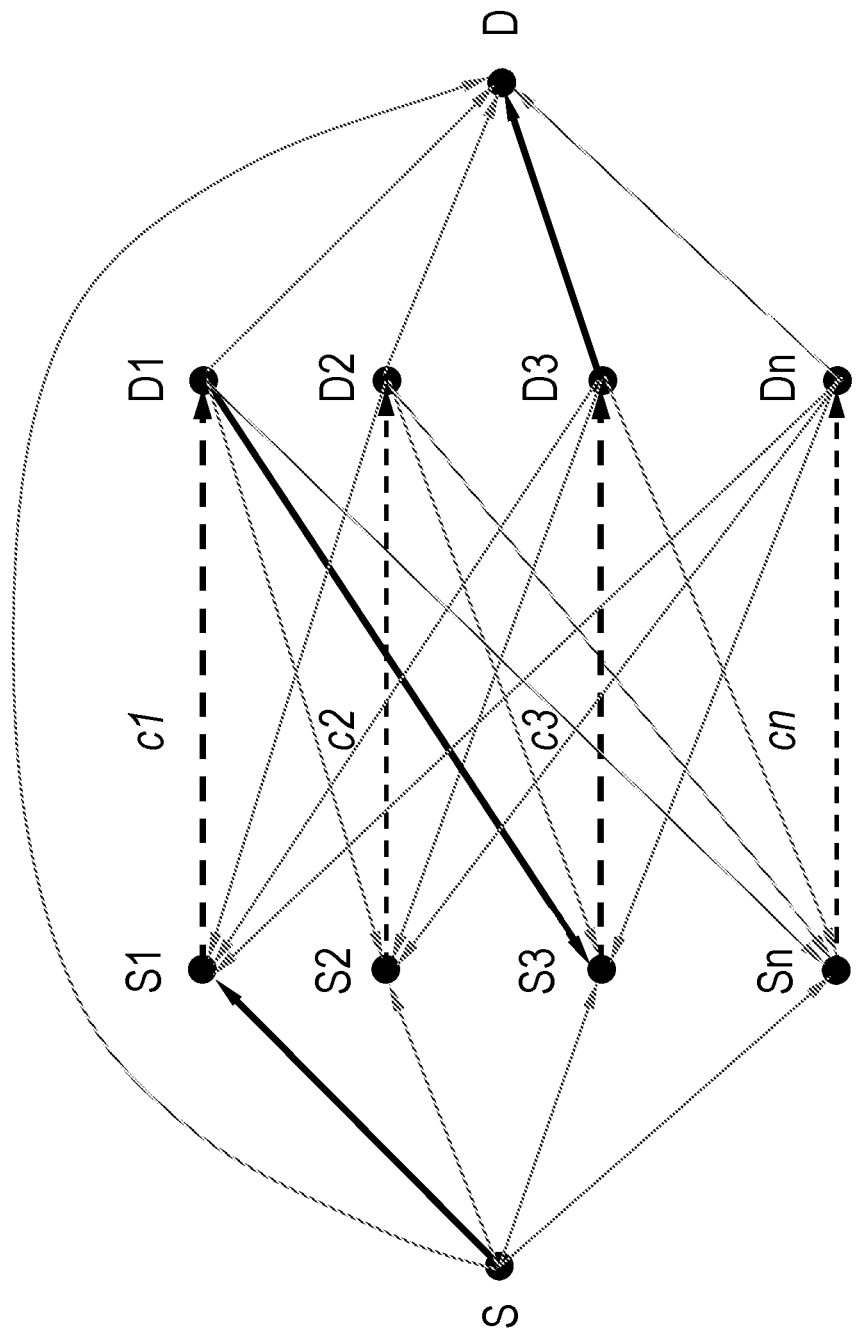
FIG. 3 is an illustration of a decomposition process, where one possible path from S to D is highlighted, which contains 3 deterministic edges (S-S1, D1-S3, and D3-D) and 2 stochastic edges (S1-D1, and S3-D3).

Based upon Bayesian and Dempster-Shafer theories, the standardized reduced network is decomposed into multiple atomic subnetworks. FIG. 3 illustrates an example of the decomposition process, where one scenario is identified with a possible stochastic path from S to D, which contains 3 deterministic edges (S-S1, D1-S3, and D3-D) and 2 stochastic edges (S1-D1, and S3-D3). Following the same procedure, other possible stochastic paths can be derived. Once all of the possible stochastic paths are derived, the network is considered decomposed.

Figure 4:
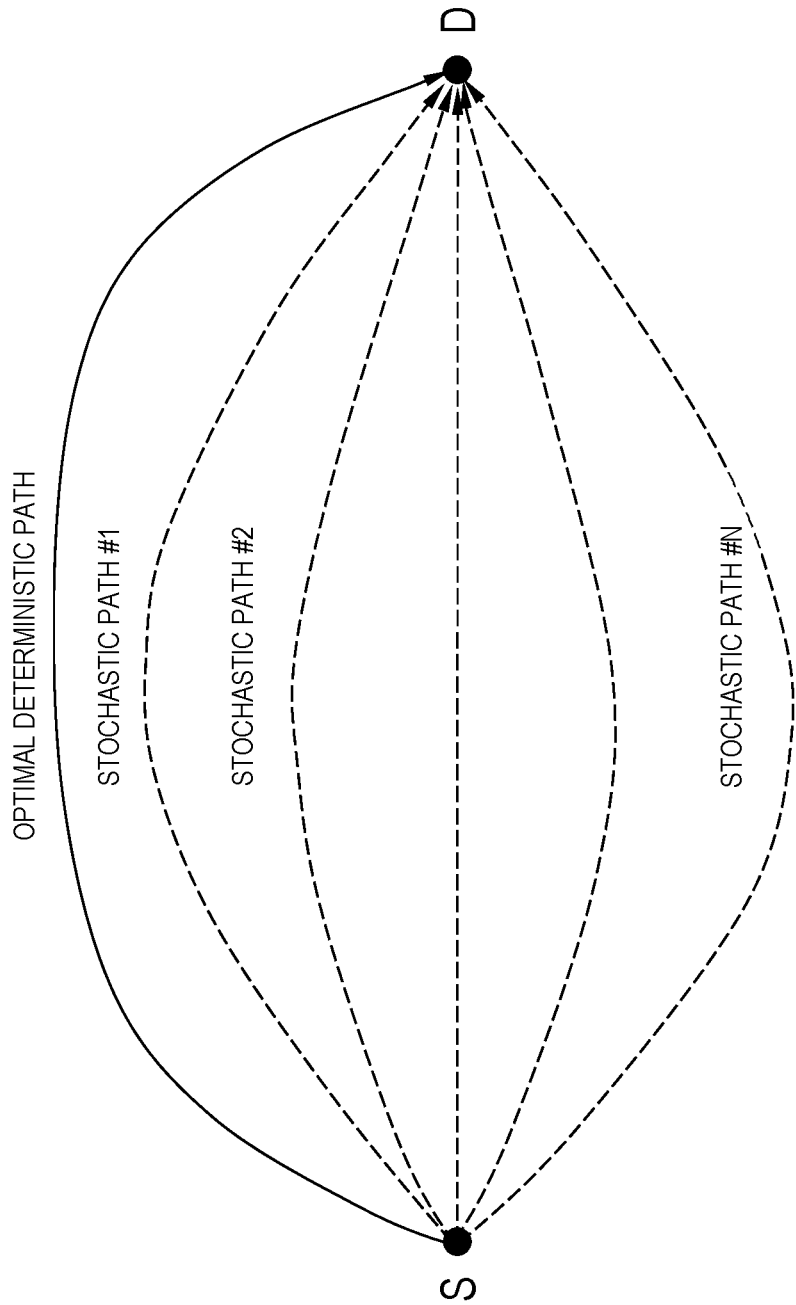
FIG. 4 shows example scenarios of decomposed atomic subnetworks where there is only one deterministic optimal path from S to D and multiple (N) stochastic optimal paths, each of which may involve multiple deterministic edges and one or more (up to n) stochastic edges.

For each atomic subnetwork, the probability distribution of the total cost can be determined by using sequential convolution, probability density function (PDF) shifting and PDF reshaping techniques, since there are deterministic and stochastic edges in each scenario. Following the same procedure, all possible stochastic paths can be derived based on the connection graph. FIG. 4 illustrates an example of the resultant possible paths, where each scenario is independent and exclusive from others and the combination should comprise all scenarios of the routing options. In the decomposed network as shown in FIG. 4, the cost of the deterministic path is fixed, while the costs for stochastic paths are subject to combined probability distributions, which are calculated from the convolution and PDF shifting and reshaping techniques.

Probabilistic Optimization Solver

When running Monte-Carlo simulation, an important step is to generate a large number of samples for random variables which will be used to conduct experimental runs individually as simulations. However, the total time for these simulations would be reduced if some samples could be removed from consideration in apparent "out of range" scenarios. As an example, adaptive bounding can be applied to the sampling process.

Figure 5:
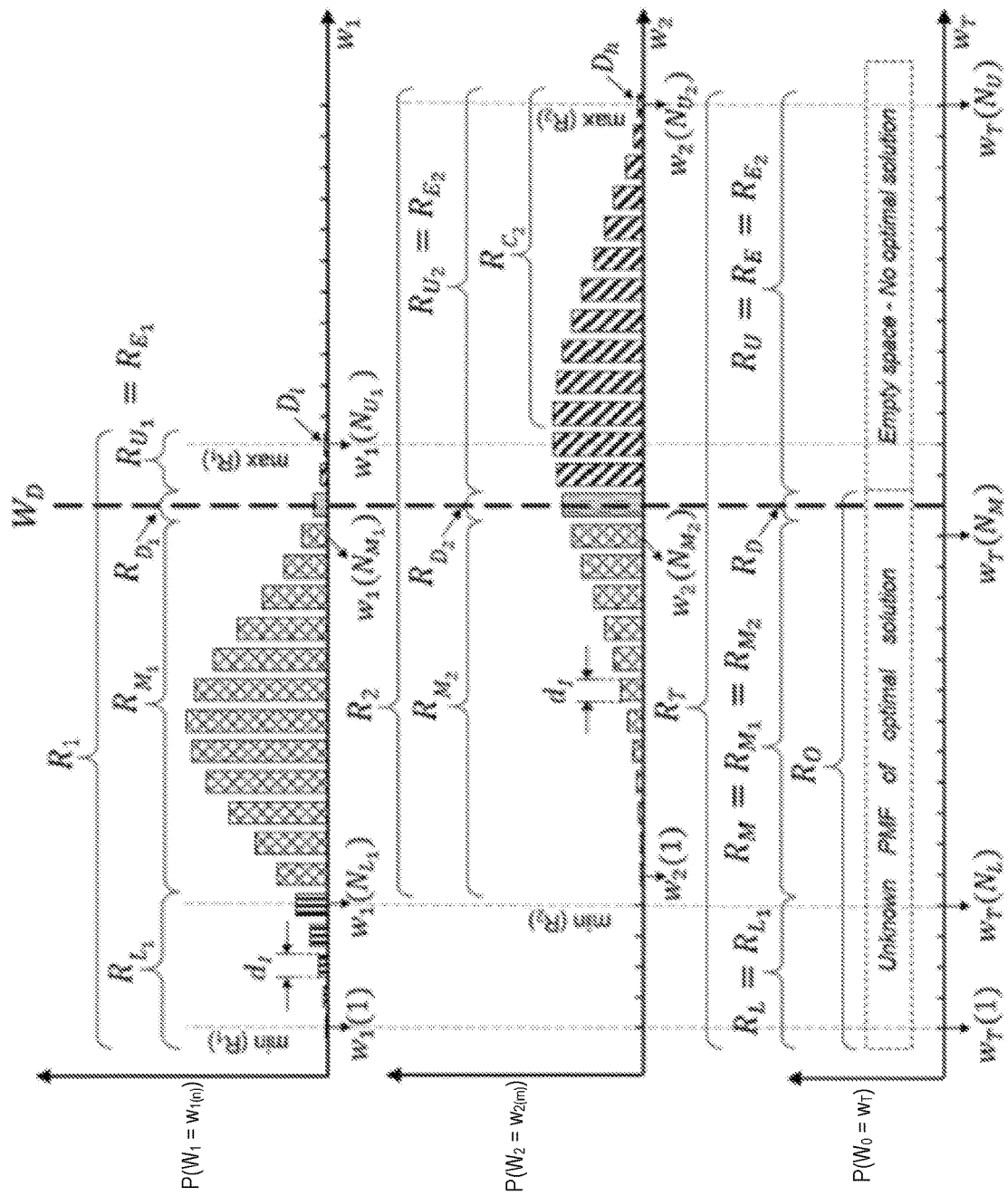
FIG. 5 is an illustration showing a general scenario of two random variables and a deterministic variable for consideration of PDF discretization and bounding.

FIG. 5 shows a general scenario for two random variables and a deterministic variable in in considering a probability distribution of the optimal solution using curve bounding. When the value of a random (stochastic) variable is higher than the deterministic variable, this portion may be discarded due to apparently high costs, for instance, Region $R_{U1}$ or $R_{U2}$ in FIG. 5. When the value of a random variable is lower than the deterministic variable as well as the minimum value within a certain confidence interval (e.g., 99%), this portion may not be discretized for comparison but will be directly considered for the later probability calculation, for example, Region $R_{L1}$ in FIG. 5.

EXAMPLES

FIG. 6 shows the network or map under study, where the vehicle will move from Point 7 to Point 9. The solid lines represent deterministic edges with constant costs and dashed lines indicate edges with stochastic costs. This is a snapshot of a driving condition of an autonomous vehicle. The connection and cost matrices are updated at any decision step, e.g., every 100 milliseconds.

As an example, the Weibull distribution is considered here for modeling the travel costs or weights (e.g., travel time or fuel cost) of the stochastic edges, since the costs are positive and may vary over a large range. FIG. 7A-D shows the probability density curves of the costs for the stochastic edge c1-c4 in the example network, respectively. It is worthwhile to note that many different types of probability distributions can be directly handled by the disclosed decision engine as long as the analytic expressions of PDF or appropriate sample datasets can be found.

Figure 8:
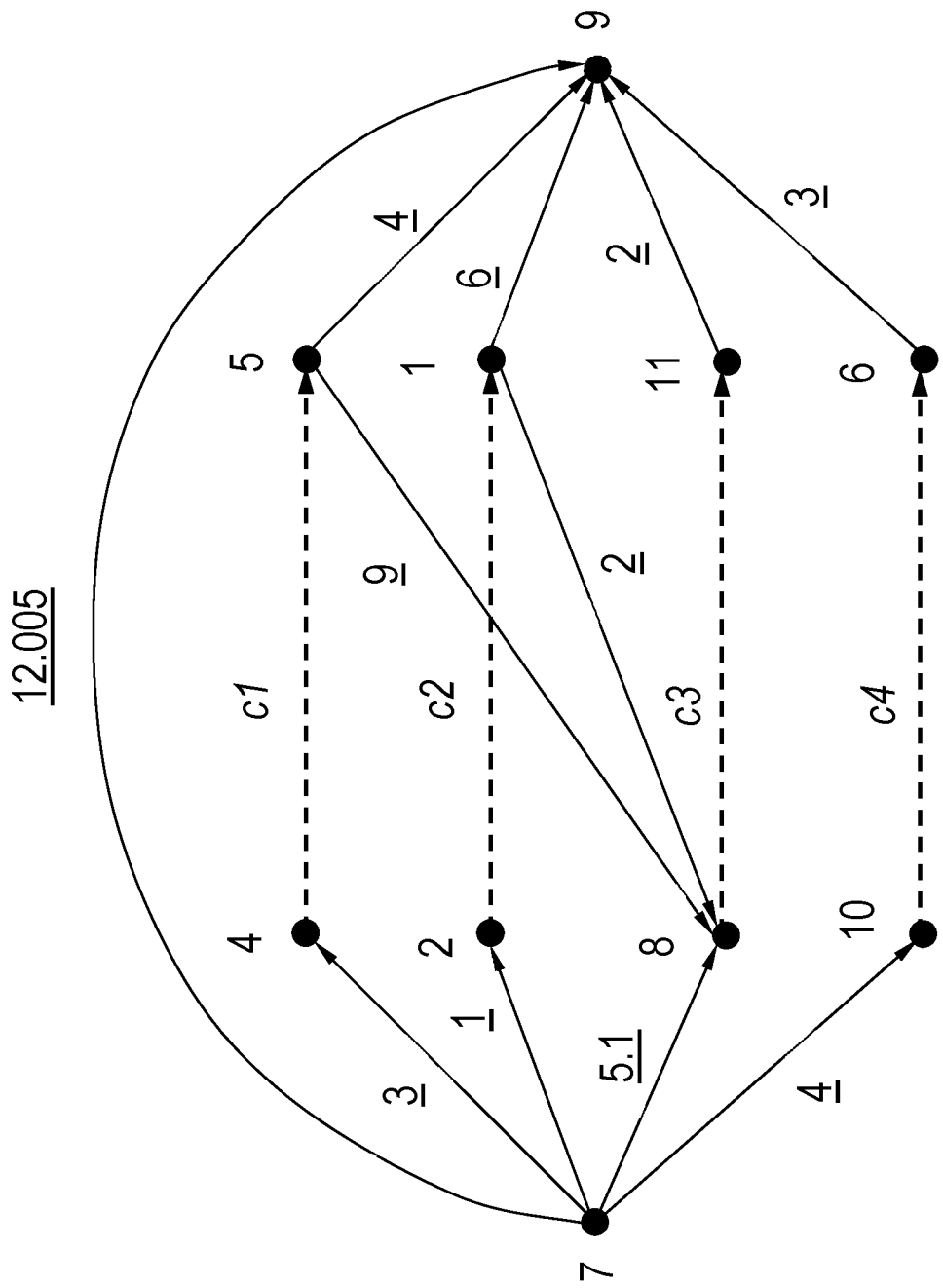
FIG. 8 shows a reduced network in the standardized form, which has one possible deterministic path and 4 stochastic edges.

Using the standardization process above, the network can be reduced to a much simpler network, as shown in FIG. 8.

In this example, the order/rank of the standardized stochastic network is four, i.e., the number of independent (individual or combined) stochastic edges. This number does not change, while some deterministic edges have been merged. In the network standardization process, the node indices of the original network can be tracked, as shown in FIG. 16. Ten nodes (vertices) are preserved, and the reduced network is smaller than the original network in terms of possible paths from the start point to the destination. It is valuable to note that the first deterministic path (i.e., path 1, i.e., 7-3-10-9, in the original network), which contains multiple deterministic edges in the original network, has been found by Dijkstra's algorithm before the standardization.

Figure 9:
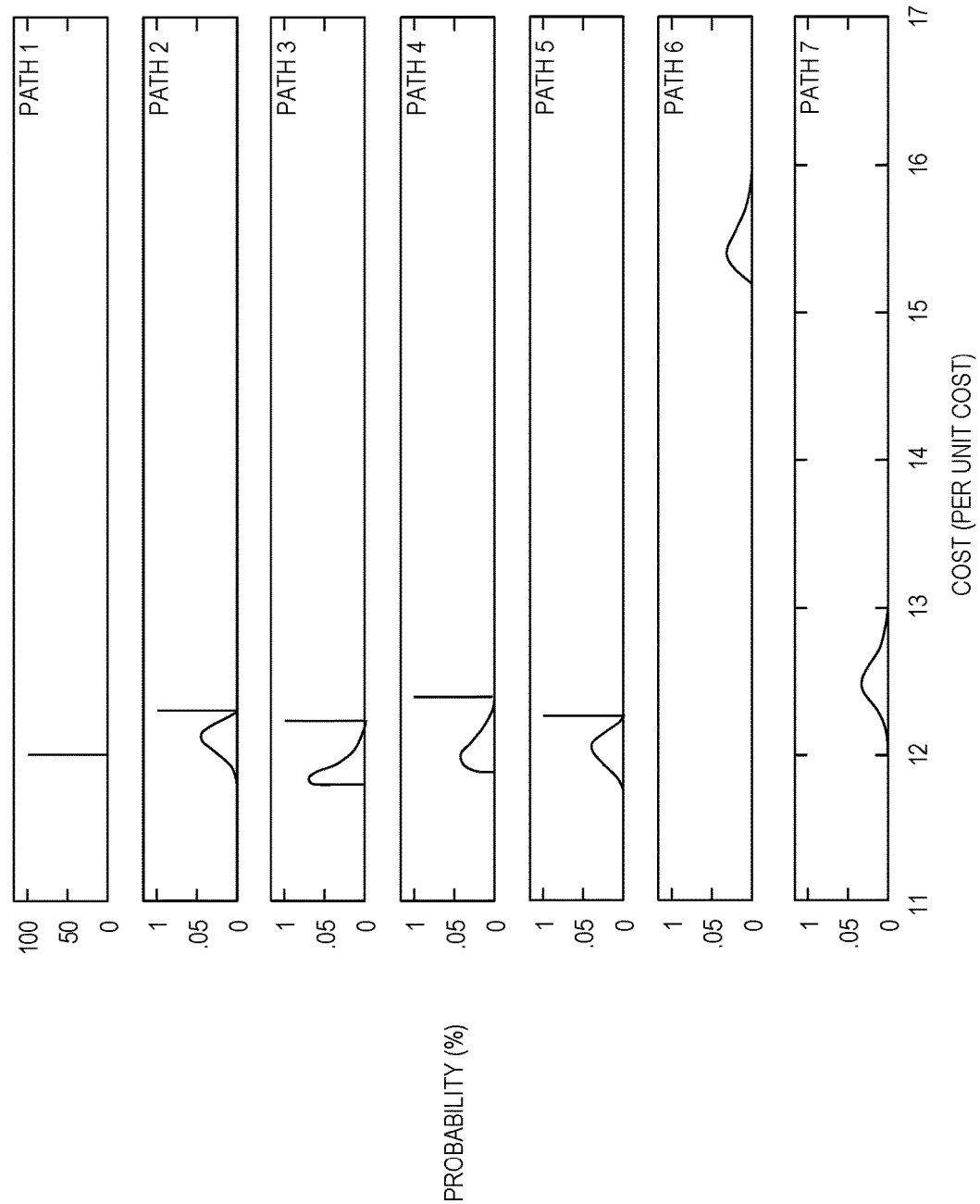
FIG. 9 shows an illustration of decomposed atomic sub-networks, i.e., 7 possible paths, and their cost distributions, where the high bars on the right side considers the PDF tails.

Using the decomposition process above, the standard network can then be decomposed, and the atomic subnetworks are very simple and easy to solve. Each route is an atomic network and may contain multiple branches in the standard network and many edges in the original network. The seven possible paths, and their cost distributions are shown in FIG. 9, where the high bars on the right side considers the PDF tails. It is worthwhile noting that the cost's probability distributions for the six stochastic edges are calculated from the original PDF functions of the four stochastic edges in the original network. Interestingly, the last two options can be excluded from the further consideration since the cost is always higher than that of the deterministic path.

Figure 10:
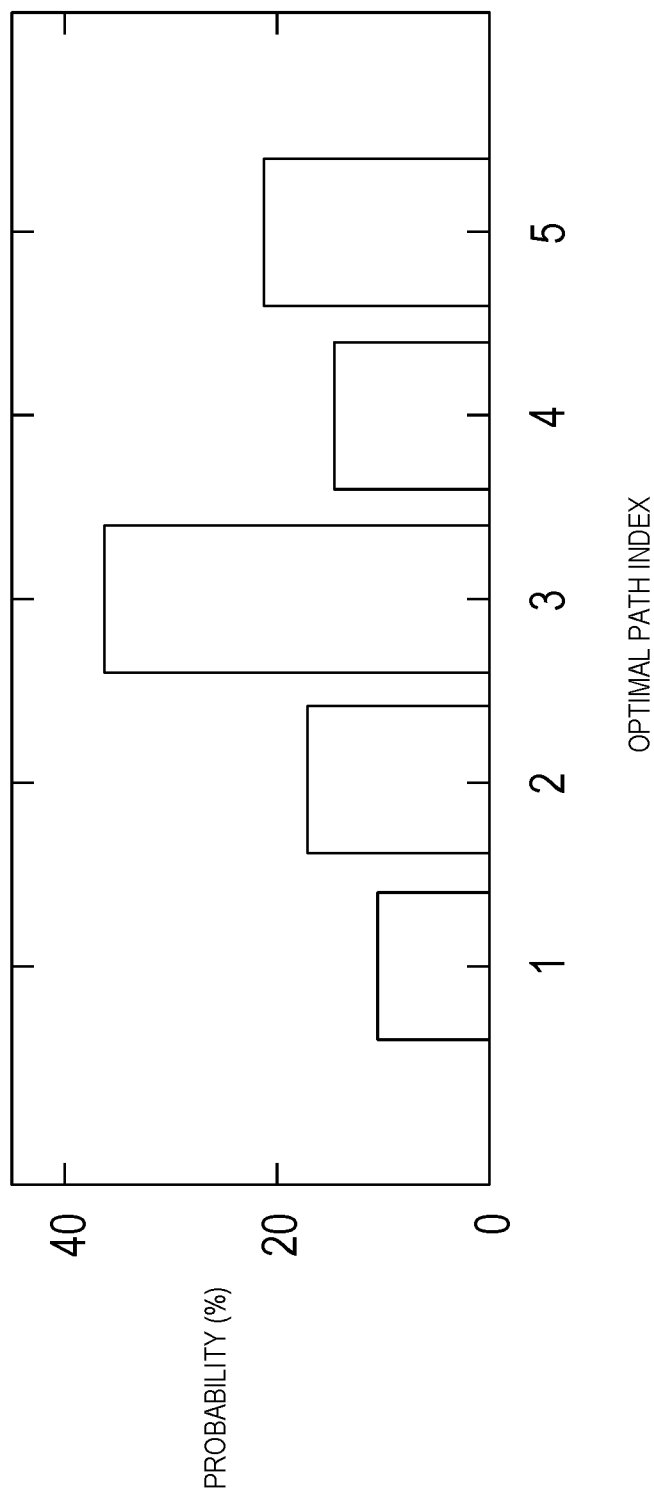
FIG. 10 shows probability distribution of possible optimal paths.

FIG. 10 shows the result about the probability distribution of potential optimal paths using the analytical approach described above. A simulation is run and the results obtained on a multi-core computing system (with Intel Xeon CPU E5-4657L, 2.40 GHz, 12-Core Processor and 256 GB memory). It takes less than 100 milliseconds to complete the solution. In FIG. 10, we can see that path 3 (i.e., 7-2-1-5-11-9 in the original network) ranks as the top choice with a probability of 36.4%. The probability that the deterministic path (path 1, i.e., 7-3-10-9, in the original network) is optimal among all is around 10.42%. It is worth noting that the probabilistic distribution of the potential optimal paths are dependent on the original stochastic costs of the individual edges in the original network.

Figure 11:
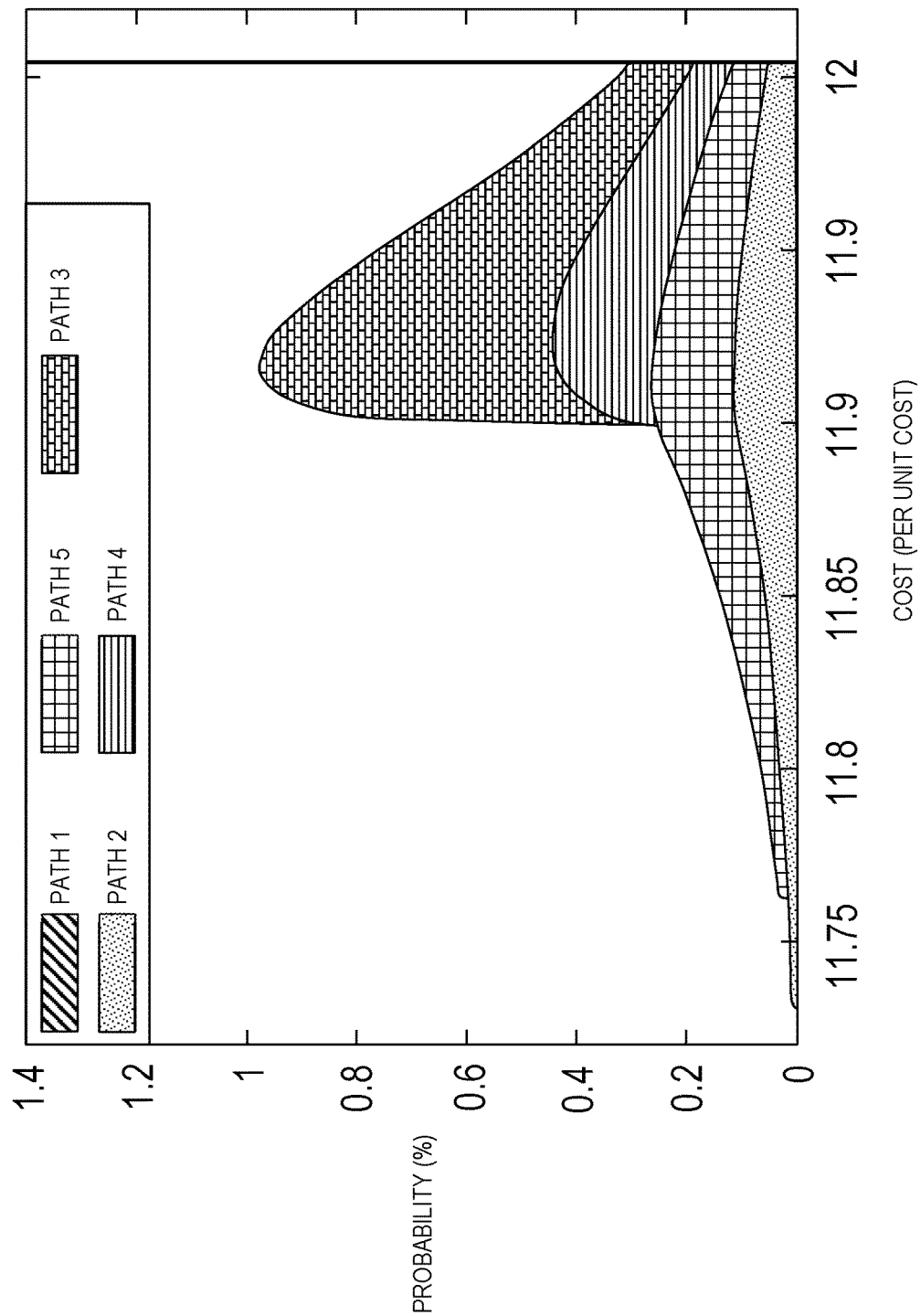
FIG. 11 shows cost distribution of the optimal paths, where path 1 is the deterministic optimal path with a probability of 10.42%.

FIG. 11 illustrates the cost distribution of the optimal paths for a range between approximately 11.73 and 12.005 per unit cost. The areas between the curves (i.e., integration of respective PDFs) are the respective probability values of the optimal paths. Since the cost of the deterministic path [7-3-10-9] is 12.005 per unit, it becomes a better option when the stochastic cost in other parallel paths could be higher than this value. This explains why there exists no cost higher than that value, and therefore the bar for the 12.005 per unit cost interval looks very high, i.e., 10.42%. This mechanism will provide a feature that the stochastic optimal solution will be bounded by the deterministic optimal solution.

Deterministic optimization is also performed by considering the mean values of the probabilistic costs for the stochastic edges. It is found that the optimal solution with the highest probability in stochastic optimization is the same as what is obtained from deterministic optimization considering the expected mean values. Compared with the pure-deterministic approach which only uses constant costs or expected values of the stochastic costs, the probabilistic optimization solution provides more information such as the probability distribution of multiple possible optimal paths instead of a single path. As the uncertainty changes (e.g., the stochastic costs have different PDFs), this probability distribution output will also change. This will provide an adaptive snapshot of the dynamic environment, which is especially useful for the autonomous driving where decision making could be based on this information instead of only human driver's experience and instruction.

Figure 12:
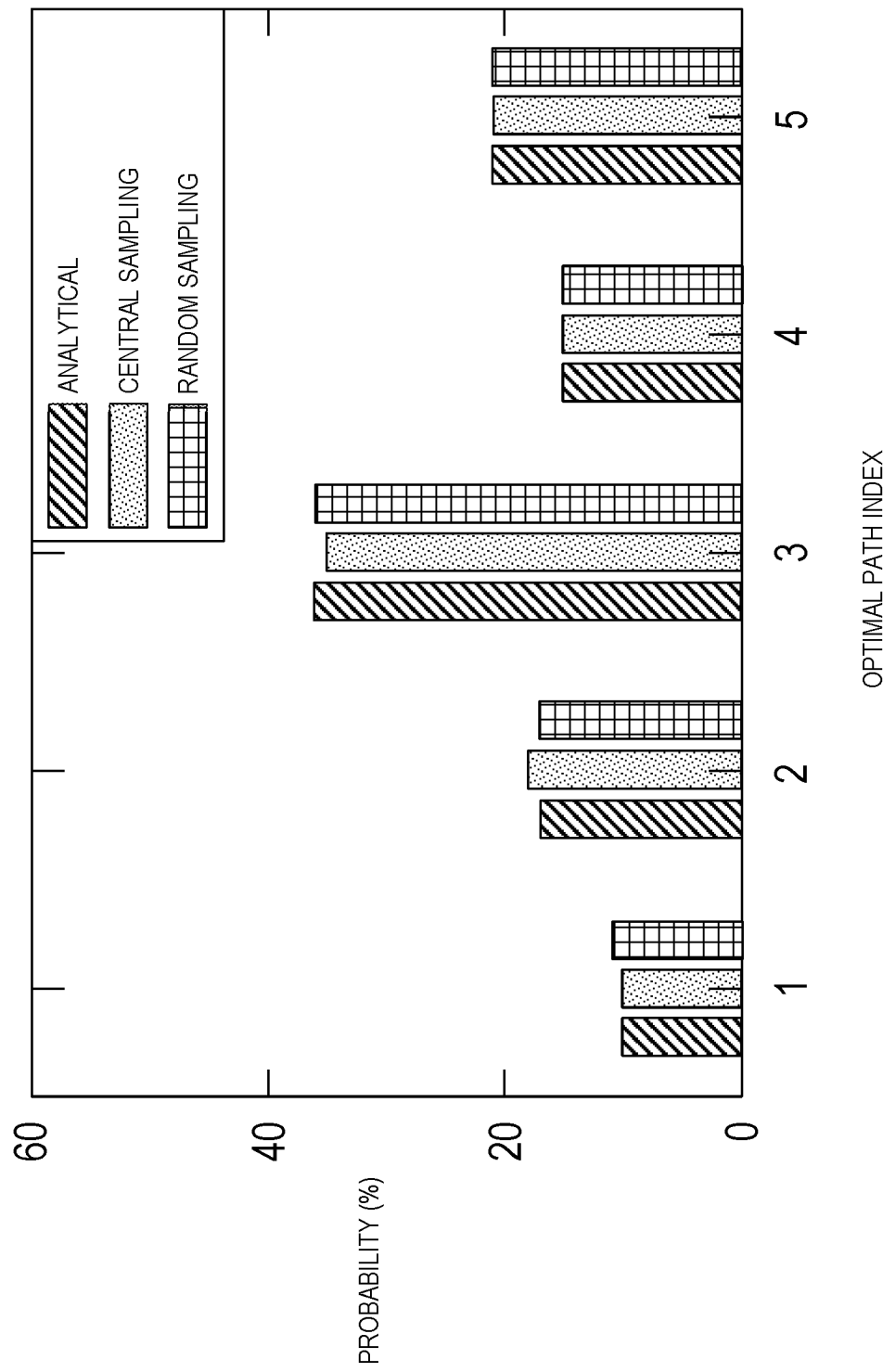
FIG. 12 shows a comparison of analytical results with Monte-Carlo simulation results, where Case 2 is Monte-Carlo simulation with central sampling and Case 3 is Monte-Carlo simulation with random sampling in the intervals.

FIG. 12 presents the comparison of analytical results obtained above using the processes described herein with Monte-Carlo simulation results, where Case 2 is Monte-Carlo simulation with central sampling and Case 3 is Monte-Carlo simulation with random sampling in the discrete cost slices. The slice width is 0.01 (per unit cost) and 300 random samples are taken from each stochastic edge. In this process, slices of equal width are taken to divide/discretize the cost into multiple units or intervals for computing the probability analytically.

FIG. 17 compares the calculated probability values of potential optimal paths calculated using the analytical and simulation methods, respectively. It can be seen from FIGS. 14 and 17 that the Monte-Carlo simulation results match analytical calculations very well, which also suggests that the network decomposition concept discussed herein is valid for stochastic optimization. However, in this case, the run-time for the Monte Carlo simulation is higher than 100 seconds, while it takes less than 100 milliseconds to complete the solution above. This study suggests that the time needed to find the solution using the proposed analytical decision engine can be reduced by three to four orders of magnitude, compared with the Monte-Carlo method.

Sensitivity analysis was performed to understand how the changes in parameters, such as the number of samples for Monte Carlo simulation, computational confidence interval and discrete slice width for analytic probability calculation, may affect the solution accuracy.

Figure 13:
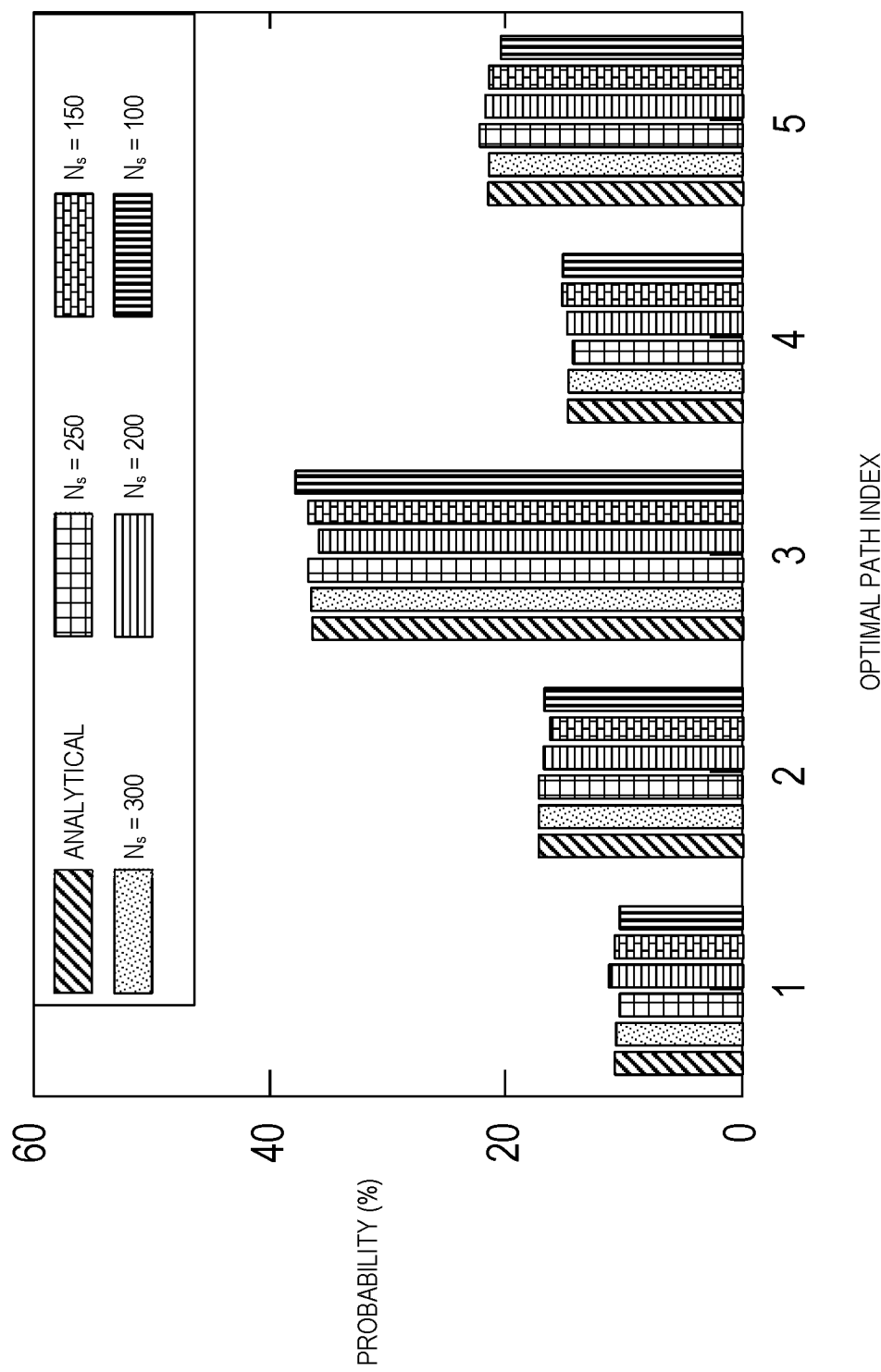
FIG. 13 shows a comparison of probability distribution of possible optimal paths under different conditions.

FIG. 13 shows the probability distribution of the possible best paths. In addition to the baseline (Case 1), five additional cases are considered for the Monte Carlo simulation with different number of samples. FIG. 18 also lists the sensitivity analysis showing the relative error between the analytical method (baseline) and Monte Carlo simulation. It shows that the relative error becomes the lowest with the highest number of samples in the Monte Carlo simulation.

Figure 14:
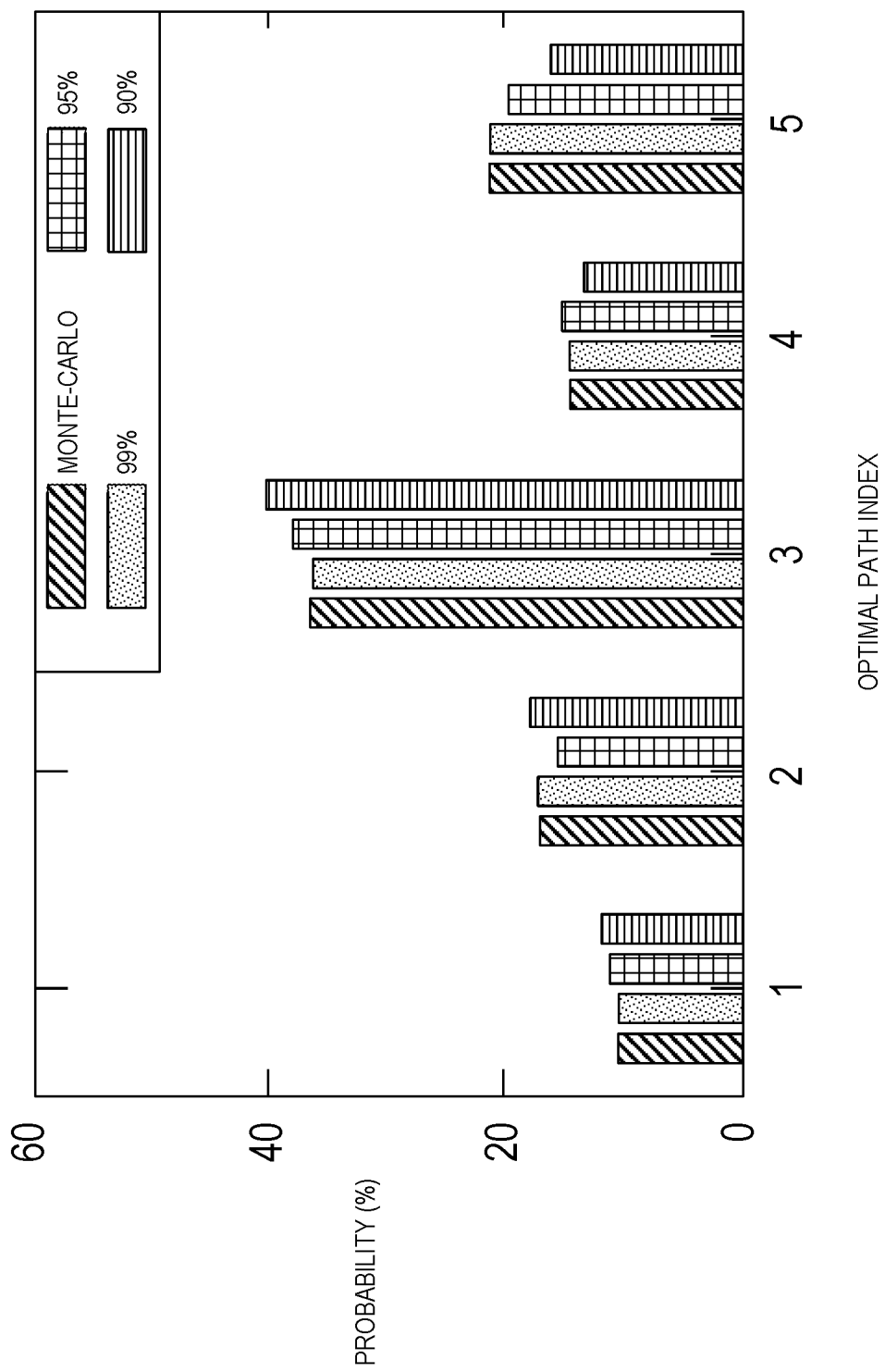
FIG. 14 shows a comparison of probability distribution of possible optimal paths under confidence intervals.

FIG. 14 shows the comparison of probability distribution of the possible optimal paths under different confidence intervals. The analysis is achieved through analytical calculations, and in the figure, the confidence interval of probability mass function of the optimal path weight is equal to $ci^2$, where ci=99%, 95% and 90%. This is because there are two stochastic edges in parallel with each other in some atomic subnetworks. While there are slight changes in the probability distribution, FIG. 19 shows that the analytical results with the highest confidence interval (99%) match the Monte Carlo simulation best.

Figure 15:
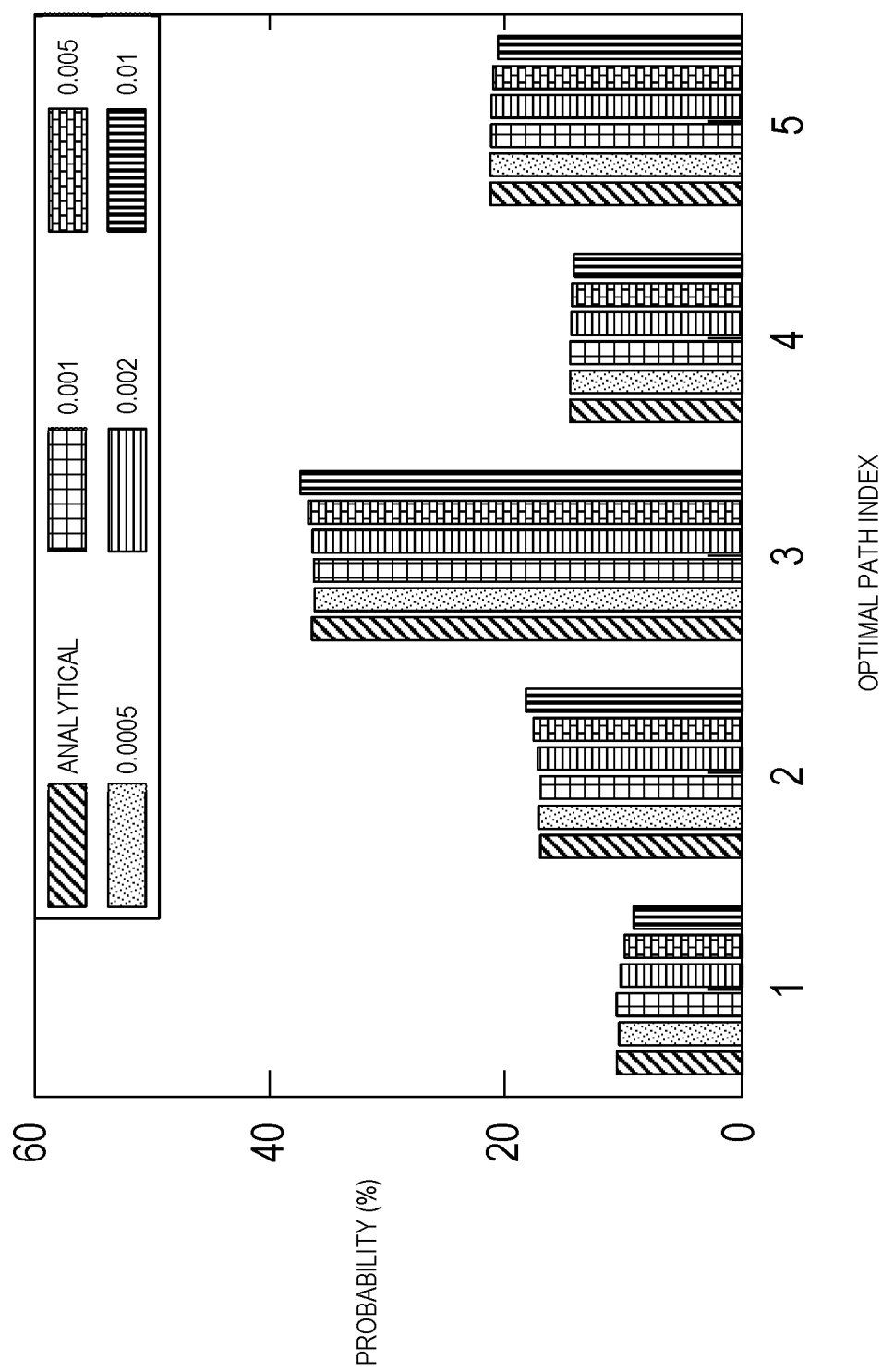
FIG. 15 shows a comparison of probability distribution of possible optimal paths under different numbers of slices with 99% confidence interval for each stochastic variable.

FIG. 15 compares the probability distribution of the possible optimal paths under different slice widths (i.e., numbers of slices) within the 99% confidence interval. The confidence interval of probability mass function of the final optimal path's weight is $0.99^2=0.9801$ for all five cases. It seems that there are slight changes in the probability distribution. However, the relative error between the Monte Carlo simulation (baseline) and the analytical methods decreases as the number of slices increases (or the slice width decreases), as shown in FIG. 20.

As shown above, the probabilistic decision engine uses a network connection matrix (based on maps and graph theory) and a cost matrix (with entries of the cost's mean values and probability distributions) as its input and generates the probability distribution of optimal routes as its output. Basically, the disclosed probabilistic decision engine comprises a stochastic network standardization module, a stochastic network decomposition module and a probabilistic computational solver (i.e., optimization kernel). In the presented probabilistic decision engine, a deterministic network reduction method based upon Dijkstra's algorithm is first used to derive a standard reduced network, augmented by stochastic network reduction. The standard network is then decomposed into a series of stochastic subnetworks by using the sequential convolution and PDF shifting and PDF reshaping techniques. An analytical probabilistic solver is finally used to solve the stochastic decision-making problem.

The operational principle and implementation methods of the entire probabilistic decision engine are discussed in detail. These component algorithms are then used in an example navigation problem considering stochastic costs in some paths. Representative results are provided to demonstrate the effectiveness of the disclosed computational solver and compared with the traditional Monte-Carlo simulation method to validate the analytic results. The optimal solution with the highest probability in stochastic optimization is found to be the same as what was obtained from deterministic optimization considering expected mean values, but stochastic optimization provides more information such as the probability distribution of multiple possible optimal solutions instead of a single solution. Timing and accuracy issues are discussed. The time needed to find the solution using the disclosed decision engine can be reduced by three to four orders of magnitude, compared with the Monte-Carlo simulation method. The impact of number of samples, confidence interval and analytical slice width on the stochastic optimization solution is also studied.

After the optimal path is determined, the processor can create instructions to control the vehicle based on the determined optimal path. Then, the instructions are used to control the autonomous vehicle, wherein the instructions control components of the autonomous vehicle such as steering, brakes, acceleration, etc. Thus, the systems and processes described above may be run on an autonomous vehicle itself.

Figure 21:
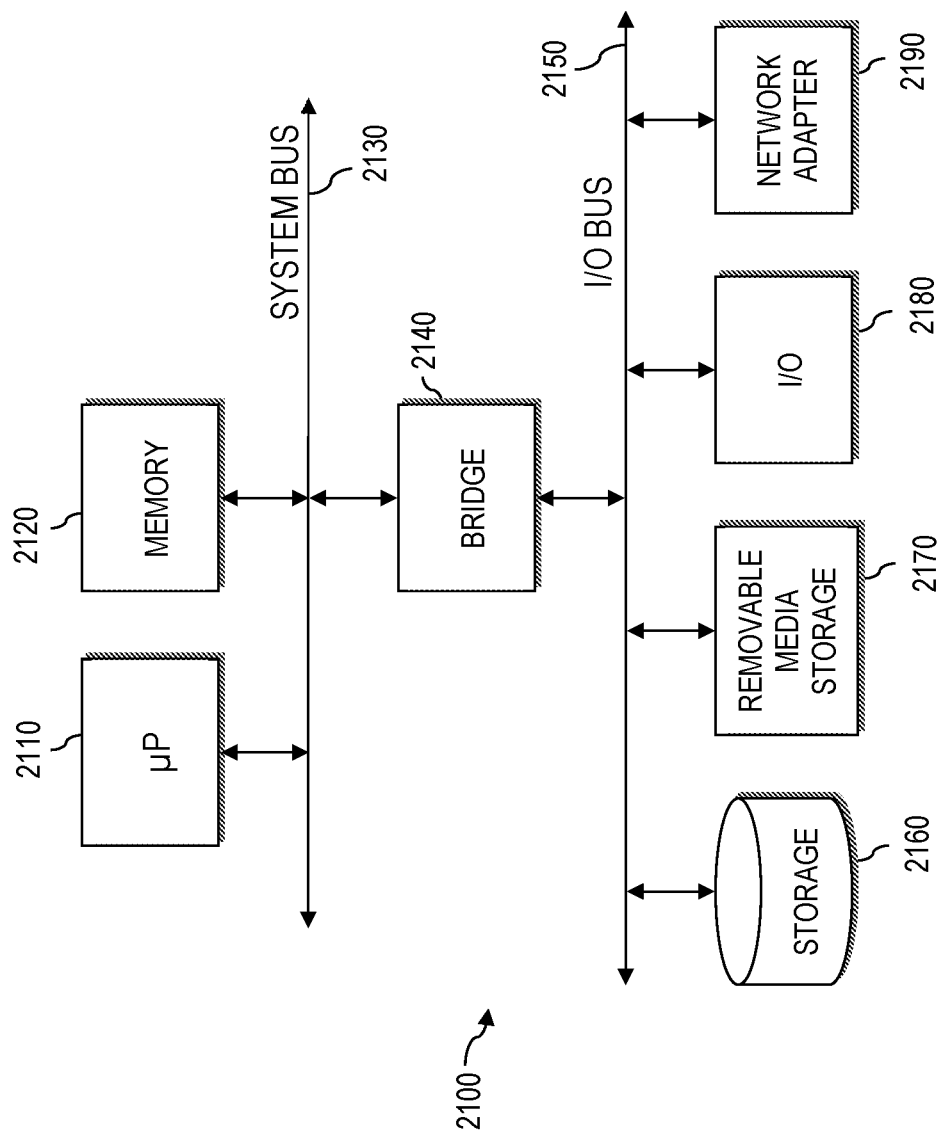
FIG. 21 is a block diagram for a computer system that may run processes described herein, according to aspects of the present disclosure.

Referring to FIG. 21, a block diagram of a hardware data processing system is depicted in accordance with the present disclosure. Data processing system 2100 may comprise a symmetric multiprocessor (SMP) system or other configuration including a plurality of processors 2110 and local memory 2120, each connected to system bus 2130. Alternatively, a single processor 2110 may be employed. An I/O bus bridge 2140 interfaces the system bus 2120 to an I/O bus 2150. The I/O bus 2150 is utilized to support one or more buses and corresponding devices, such as storage 2160, removable media storage 2170, input/output devices 2180, network adapters 2190, other devices, combinations thereof, etc. For instance, a network adapter 2190 can be used to enable the data processing system 2100 to communicate with other data processing systems or remote printers or storage devices through intervening private or public networks.

The memory 2120, storage 2160, removable media storage 2170, or combinations thereof can be used to store program code that is executed by the processor(s) 2110 to implement any aspect of the present disclosure described and illustrated in the preceding FIGURES.

The probabilistic decision engine may be implemented in hardware, software, firmware, or a combination thereof. In the preferred embodiment(s), the probabilistic decision engine is implemented in software or firmware that is stored in a memory and that is executed by a suitable instruction execution system. If implemented in hardware, as in an alternative embodiment, the probabilistic decision engine can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The probabilistic decision engine can be implemented as a computer program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. An autonomous vehicle comprising:
a sensor that produces environmental data;
a location tracker that produces location data; and
a processor that:
converts the environmental data and the location data to maps and localization data, which are then converted to a navigation model;
creates a network connection matrix based on the navigation model;
derives a standardized reduced network based on the network connection matrix using a deterministic network reduction and a stochastic network reduction;
creates a decomposed network by decomposing the standardized reduced network to create stochastic subnetworks, wherein the decomposing is performed using convolution, a probability density function, and probability density function reshaping;
determines an optimal solution for a navigation route based on the probability distribution of optimal routes of the decomposed network using a probabilistic solver;
creates instructions for components of the autonomous vehicle based on the optimal solution; and
controls the autonomous vehicle based on the instructions.

2. The autonomous vehicle of claim 1, wherein the processor derives the standardized reduced network based on the network connection matrix using the deterministic network reduction by performing the deterministic network reduction using Dijkstra's shortest path first algorithm.

3. The autonomous vehicle of claim 1, wherein the processor derives the standardized reduced network based on the network connection matrix using the stochastic network reduction by performing the stochastic network reduction using convolution.

4. The autonomous vehicle of claim 3, wherein the processor performs stochastic network reduction further by removing edges that are not associates with possible paths between nodes.

5. The autonomous vehicle of claim 1, wherein the processor creates a decomposed network by decomposing the standardized reduced network to create stochastic sub-networks by finding all stochastic paths for the standardized reduced network.

6. The autonomous vehicle of claim 1, wherein the processor determines the optimal solution for the navigation route by using adaptive bounding.

7. The autonomous vehicle of claim 6, wherein the processor uses adaptive bounding by discarding portions of the decomposed network when a random value is greater than a deterministic variable.

\* \* \* \* \*